Dec. 25, 1934.     G. S. GIVEEN     1,985,320
EGG BREAKING AND SEPARATING MACHINE
Filed Dec. 18, 1931     4 Sheets-Sheet 2
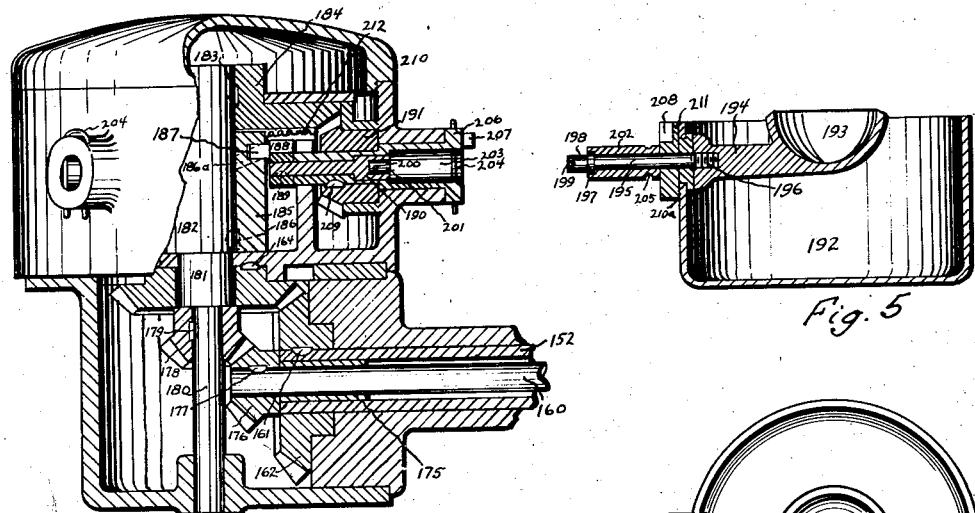
Fig. 4
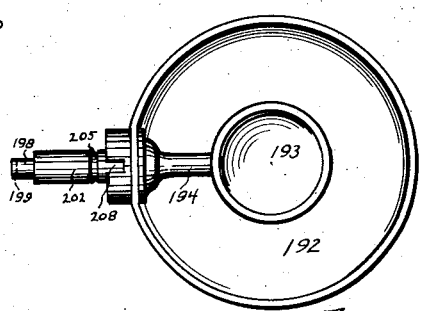
Fig. 5
Fig. 6
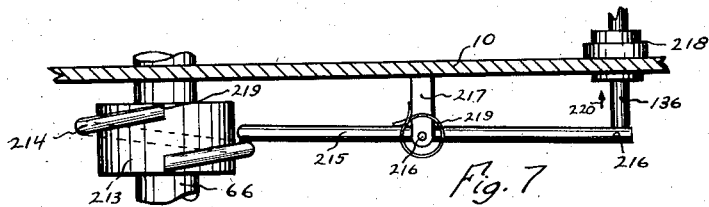
Fig. 7
Inventor
George S. Giveen
By Lynn H. Latta
Attorney Dec. 25, 1934.　　　G. S. GIVEEN　　　1,985,320
EGG BREAKING AND SEPARATING MACHINE
Filed Dec. 18, 1931　　　4 Sheets-Sheet 3

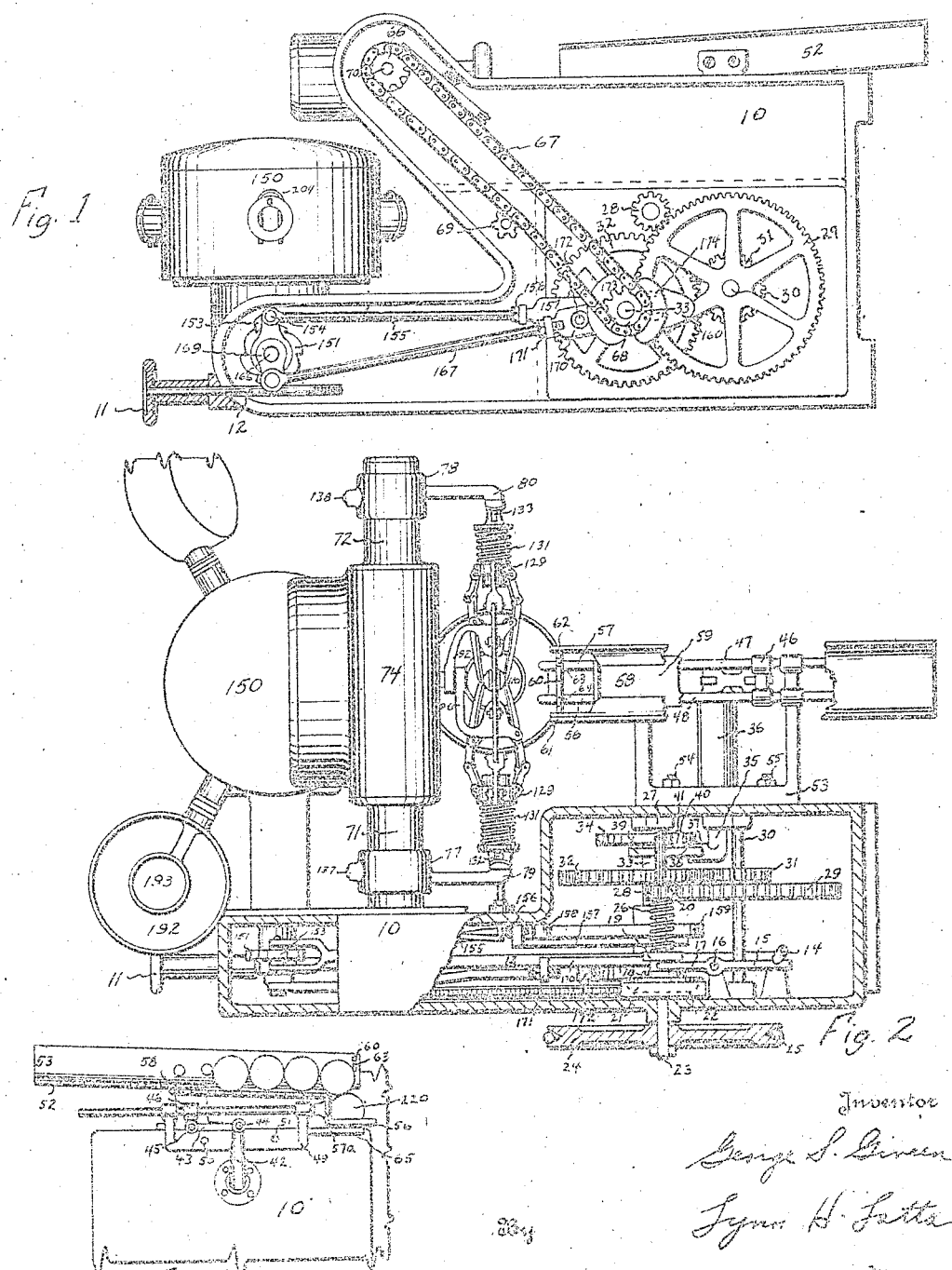

Inventor
George S. Giveen
By Lynn H. Latta
Attorney

Dec. 25, 1934.  G. S. GIVEEN  1,985,320
EGG BREAKING AND SEPARATING MACHINE
Filed Dec. 18, 1931  4 Sheets-Sheet 4
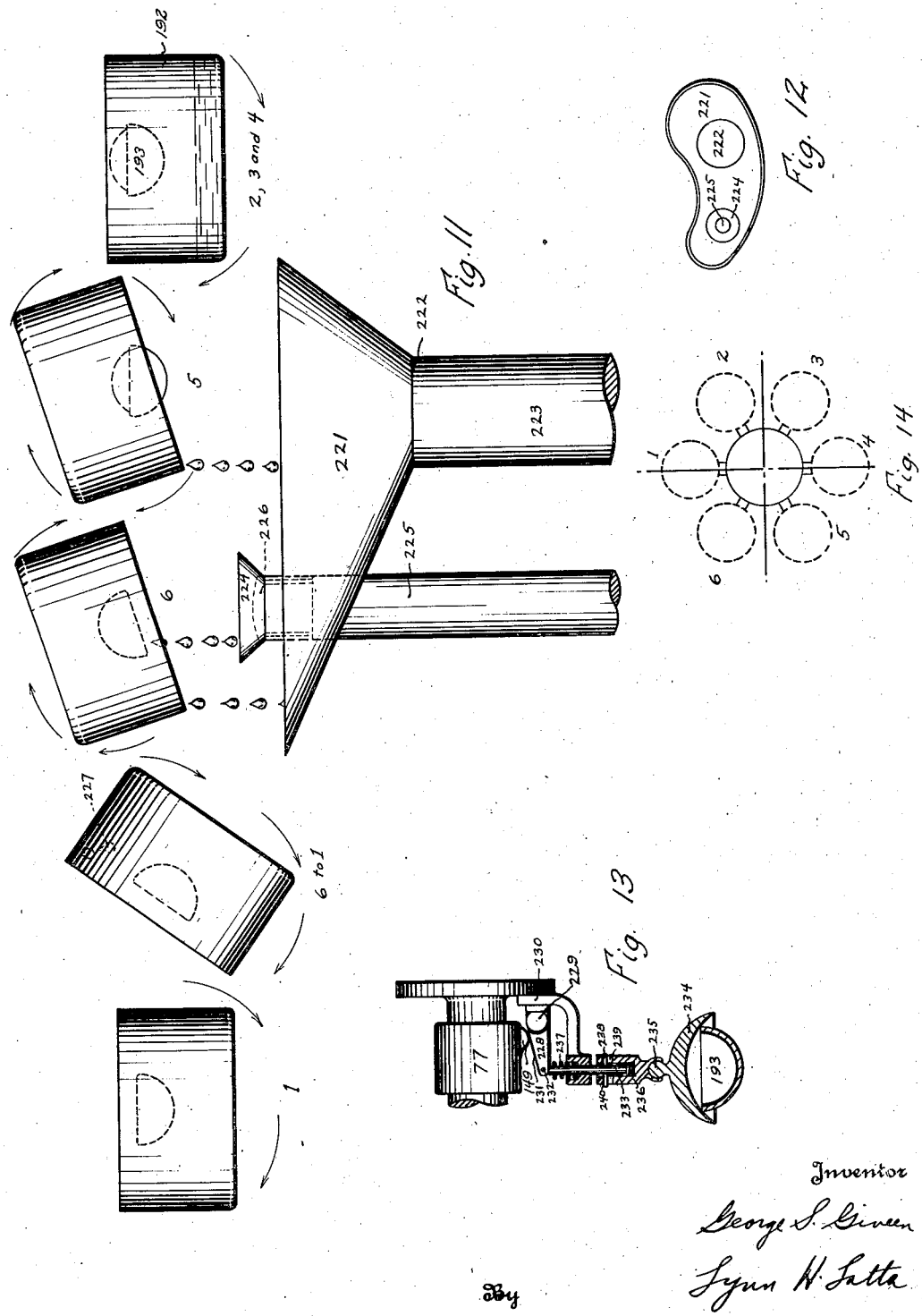

Patented Dec. 25, 1934

1,985,320

UNITED STATES PATENT OFFICE 1,985,320

EGG BREAKING AND SEPARATING MACHINE

George S. Giveen, Sioux City, Iowa

Application December 18, 1931, Serial No. 581,785

7 Claims. (Cl. 146—2)

My invention relates to an egg breaking machine which will break the egg and separate its contents without the necessity of the human factor.

An object of my invention is to provide such a machine which is completely sanitary in that its parts will function with a minimum surface coming into contact with the egg or its contents.

Another object of my invention is to provide such a machine which will break the egg efficiently without cracking the shell in too many places.

Another object of my invention is to provide a breaking mechanism together with a separating mechanism, which separating mechanism will efficiently separate the yolk from the albumen.

Another object of my invention is to provide a separating device of this character, which will separate the contents of an egg and convey the separated contents to a desired container.

Another object of my invention is to provide such a machine which will allow convenient and ready inspection of the egg while it is passing through the various cycles of the machine.

A further object of my invention is to provide inspection of the eggs as a unit, since in the usual practice the bad portions of the eggs would pass along and be mixed before the deficiency was discovered, and furthermore in my invention, in the case of a bad egg, the whole cup containing the egg can be removed, sterilized, and replaced.

A further object of my invention is to provide such a machine which will be arranged so that its various members will be synchronized perfectly to achieve the ends desired.

A further object of my invention is to provide such a machine of a minimum number of parts so that it can be manufactured at a very reasonable cost.

Figure 10:
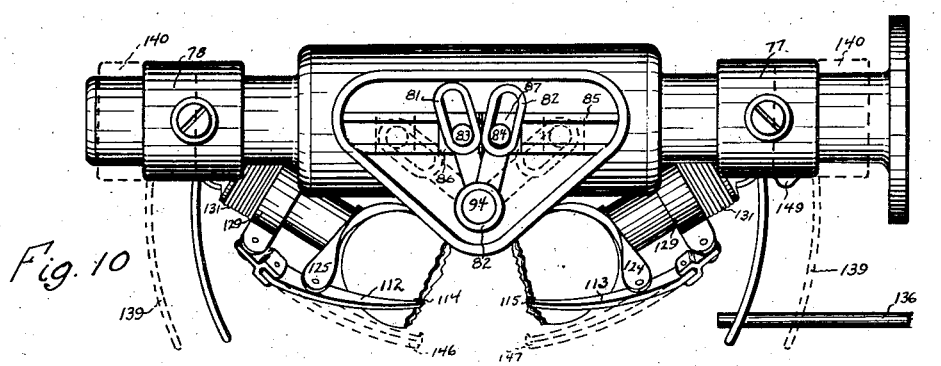
Figure 9:
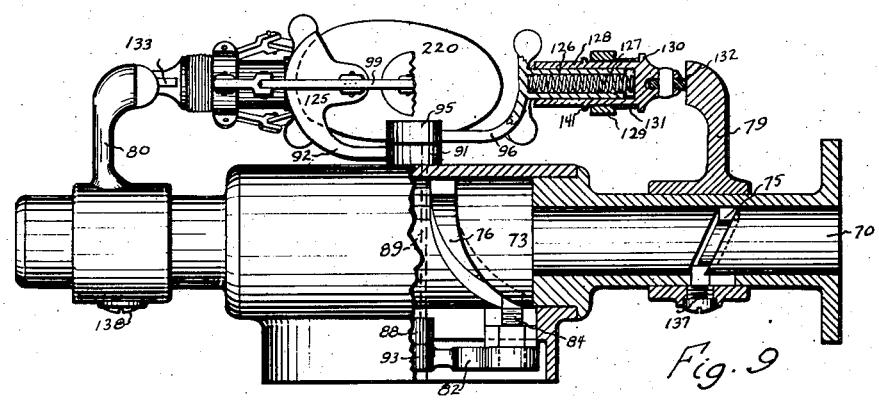
Figure 8:
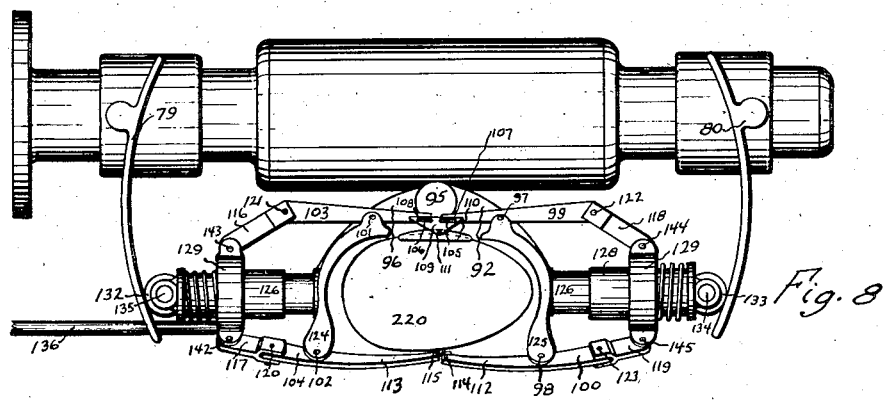

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a side elevation and sectional view taken through the gear casing, showing the main operating parts of the device, Figure 2 is a plan view of Figure 1 and with a partial section of the gear case, Figure 3 is an elevation of the loading chute in section, Figure 4 is a partially sectioned view of the turret, which carries the dumping cups, Figure 5 is a sectional view of the two dumping cups, Figure 6 is a plan view of Figure 5, Figure 7 is an enlarged detail view of the mechanism for tapping the egg breaking element, Figure 8 is an enlarged elevation of the egg breaking arms with its attached cam box, Figure 9 is a plan view of Figure 8, Figure 10 is a side elevation of the same, except showing the egg just as it is broken, Figure 11 is a sketch showing the cycles of operation of the dumping cups, Figure 12 is a plan view of the receiving funnels, Figure 13 is a partially sectioned view of the stripper mechanism, and Figure 14 is a view showing the six positions of the cups.

In developing my invention to its present form, it was necessary to bear in mind the following factors:

First, the egg must be broken efficiently,

Second, the contents of the egg must be dropped, namely the yolk and albumen must be separately distributed to separate receptacles, Third, the process must be kept through at least a series of its operations so the egg contents could be examined, Fourth, the contents of the egg should be thrown off in receiving cups without any wastage, Fifth, the entire mechanism should be synchronized perfectly so as to allow perfect functioning, and the mechanism should be constructed so that variations in the size of eggs would be readily taken care of.

I will now explain how my present invention accomplishes the above results.

I have used the reference character 10 to designate generally the casing, in which the various driving elements are journalled and positioned. (See Figure 1.) For putting the device in operation, I use the clutch handle 11. This clutch handle 11 is pinned to the shaft 12 and is rigidly connected to a continuation 13 of the shaft 12, which continuation 13 is pivotally secured to the element 14. (See Figure 2.) When the handle 11, which is circular in shape, is pulled outwardly, the link 14 is forced upwardly away from the lever arm 15. The lever arm 15 is pivotally secured with the pin 16 and terminates in the extended portion 17.

The portion 17, is received between the hubs 18 and 19, which are an integral part of the shaft 20. The hub 18 is shaped on its outer face as at 21, which face is received within the recessed member 22. This member 22 is an integral part of the shaft 23, to which the driving wheel 24 is connected. This driving wheel 24 is driven from an electric motor, not shown in the drawings, by the belt 25.

It will be seen from the foregoing that when the arm 11 is pulled out and the link 14 slightly elevated, the spring 26 will force the clutch member 18 in driving engagement with the member 22 so that the entire mechanism will be in gear and ready for driving the various elements.

It will be seen, likewise, that when the handle 11 is pushed inwardly, the link 14 will be pushed down against the arm 15, thereby raising the member 17 and forcing the clutching surfaces apart and stopping the machine.

The shaft 20 is journalled in the boss 27 and includes the small gear 28. This small gear 28 drives the larger gear 29, which is pinned to the shaft 30. A further gear 31, which is pinned to the shaft 30, drives the gear 32, which gear is pinned to the shaft 33. Secured to the shaft 33 is the cam 34. A further shaft 35 passes through the journal 36. The lower end of this shaft 35 includes the tongue and groove members 37 and the pin 38.

The member 39 is fork-shaped and is adapted to slide over the shaft 33. A roller, 40 is pinned to the member 39 by means of the pin 41. This roller, is adapted to travel against the cam 34. The other end of the shaft 35 (see Figure 3), terminates in the portion 42, which is an integral part of the shaft, but is positioned at right angles to it.

The small link, 43, is pinned to the member 42 at 44, and the link 43 is pinned at 45 to the loader device 46, which includes the pair of shafts 47 and 48.

The bracket 49 is rigidly secured to the case 10 in the usual manner by rivets or other means as at 50 and 51. The trough 52 is adapted to receive eggs at 53 by the usual method of conveyor belts, which eggs are adapted to move down the incline surface of the trough 52, as shown. Only a few eggs are shown in Figure 3, merely to indicate how the loader device operates.

The trough 52 is fastened to the gear case by a suitable bracket 53 by means of the nuts and bolts 54 and 55. The shafts 47 and 48 on the loader are secured to a pair of fingers 56 and 57, and the loader is further provided with the portion 57a and the member 58, which is a lengthened flat plate adapted to move just beneath the opening 59 of the trough 52.

I further provide the swinging member 60, which is simply a small shaft journalled in the extended portions 61 and 62 of the trough 52. This small shaft 60 is provided with downwardly extending weights 63 and 64, which are positioned as shown in Figure 2 and the purpose of which will be explained later.

A shelf 65 is attached to the bracket 49 and is provided so that in case extremely small eggs pass through the fingers 56 and 57, they will fall on this shelf 65 and will not drop to the floor.

We will now pass to the egg breaking device. The driving element of this device is the sprocket, which is 66. This sprocket is driven by means of the chain 67, which chain also passes about the sprocket 68. The sprocket 68 is pinned to the shaft 33. This chain passes over an idler sprocket 69.

The sprocket 66 drives the shaft 70. The shaft 70 passes through the journals 71 and 72 and is provided with the portion 73 of increased diameter. This portion 73 is suitably contained within the housing 74.

The shaft 70 is further provided with depressed cam portion 75 and with another cam portion 76.

The collars 77 and 78 are adapted to slide along the portions 71 and 72. These collars include the integral arced members 79 and 80.

For breaking the egg, I provide the links 81 and 82. These links are moved inwardly or outwardly by means of pins 83 and 84, which pins are adapted to slide along the frame 85. These pins are secured to the keepers 86 and 87.

The link 81 terminates in the ring portion 88, which is an integral part of the hollow shaft 89, which passes through the wall 90 of the case 74 and which again terminates in the collar 91.

The arm 92 is an integral extension of this collar. Likewise the link 82 is an integral part of the hub 93, which hub is secured to the solid shaft 94, which passes through the hollow shaft 89 and terminates in the hub 95, and the other arm 96 is an integral extension of the hub 95.

It will be seen from a study of these links 81 and 82, that when the upper end of the links tend to move apart, the arms 92 and 96 will close and when the open end of the links move together, these arms will open.

The movement of these links in the above matter is controlled by means of the cam portion 76, which portions are symmetrical on both sides of the center lines of the breaking device.

Thus it will be seen that as the shaft 70 turns, by virtue of its cam generated portion 76, the links can be opened or closed, thus opening or closing the breaking device, which will now be disclosed a little more fully.

The arms 92 and 96 are pivotally secured at 97 and 98 to the fingers 99 and 100, and the arm 96 is pivotally secured at 101 and 102 to the fingers 103 and 104.

The ends of the fingers 99 and 103 are provided with small pins 105 and 106, which are received in the slots 107 and 108, and which slots are cut out from the member 109 and which member 109 pivots the element 110 at 111. This element 110 is substantially a portion of a spherical surface and is adapted to engage the egg as shown.

The breaking fingers are designated at 112 and 113 and include the flattened points 114 and and 115. These points 114 and 115, I make substantially one-eighth inch long, by one-sixteenth inch wide, by about one-thirty second inch thick, as I find that a point made in this flattened form penetrates the egg with less breakage and is more efficient than a point, which would be too sharp.

The various fingers and breaker arms are pivotally connected to the members 116 and 117, 118 and 119 at 120, 121, 122 and 123 by means of suitable pins.

The elements 124 and 125 are secured to identical sliding shafts 126. (See Figure 9.)

The shafts 126 are recessed and include the spring 127.

The shaft 126 is slidably engaged inside the journal 128. (The right hand side of Figure 9 is being described and only this side for the sake of simplicity.)

Another collar 129 is slidably engaged with the member 128 and a flange 130 is provided so that the spring 131 can be received between this flange and the collar 129.

The outer ends of the member 128 carry the rollers 132 and 133, which are adapted to bear against the arced portions 79 and 80. Pins 134 and 135 carry the rollers.

The spring 131 is provided merely for adjustment, and the spring 127 provides the necessary element for the breaking of the egg and releasing of the shell, which will now be explained.

As soon as the egg is received inside of the fingers and just about the time when the member 110 is placed firmly on the egg and when the points 114 and 115 are about to penetrate, the small tapper 136 begins to function. At this moment the tapper strikes against the collar 129 with a sharp snap and causes the points 114 and 115 to penetrate into the egg on its lower side. Further details of this tapper will be explained later.

As soon as the points have penetrated the egg, the links 81 and 82, by virtue of the cams 76 and the pin 84, begin to close together as shown in Figure 10. It will be seen that the closing together by virtue of their connection with the hubs and shafts described, the entire finger arrangement will tend to rotate about the shaft 94 and the egg will be broken as shown in Figure 10.

As soon as the first turret cup begins to pass away from this position, the egg shell will be released in the following manner. (See Figure 9.) As the shaft 70 continues to turn, the collars 77 and 78 will be carried outwardly by virtue of the engagement of the pins 137 and 138 with the cams as shown at 75. This carries the arced portions 79 and 80 outwardly as shown in Figure 10 in dotted lines as at 139 and 140.

As soon as these arced portions are carried outwardly in the manner described, the tension of the spring 127 will force the portions 128 outwardly against these arced portions and in so doing, the member 128 will also be carried outwardly and by virtue of the small raised portion 141 on the member 128, the collar 129 will be carried outwardly.

As this collar is forced outwardly, it can be seen that by means of the pivotal connections at 142, 143, 144, and 145 the extreme ends of the fingers 99, 100, 103, and 104 will tend to open as shown in the dotted line Figure 10 at 146 and 147, and the shell will thereby be released.

A small cam 149 is provided on one of the collars to operate the stripping device, which is shown in Figure 13 and which will be explained later.

We will now pass to the turret mechanism. (See Figures 1 and 2.) The turret 150 is driven from the ratchet 151. This ratchet is pinned to the shaft 152. (See Figure 4.) A pawl 153 is positioned as shown to force the ratchet in its six successive cycles. This pawl is pivoted with the pin 154 to the shaft 155, which shaft is secured at 156 to the member 157. The member 157 carries the roller 158, which is adapted to bear against the cam 159. This cam is secured to the shaft 33.

It will be seen that this cam includes the extending portions 160, which are practically identical on both sides so that the proper sequence of the cycles can be secured.

The shaft, (see Figure 4), 152 is keyed at 161 to the bevel gear 162. This bevel gear drives the further bevel gear 163, which is pinned at 164 to the bed 165 of the turret 150. It will be seen that this driving arrangement leaves the turret free to revolve without interfering with the other functioning parts.

I will now describe the mechanism for the dumping cups. The cups are dumped by means of the shaft 166, which shaft is driven from the rod 167, which is pivoted at 168 to the extension 169, which is pinned to the shaft 166. The rod 167 is secured to the element 170 at 171. The element 170 carries the roller 172, which roller is adapted to bear against the cam 173. This cam is shaped with two symmetrical parts as at 174 on each side of the shaft as shown in Figure 1.

This is the cam for guiding the dumping cups, and it will be seen from their construction, when the shaft 33 rotates that the rod 167 will oscillate to accomplish the dumping operations.

It will be understood that the cam 173 is secured to the shaft 33. The shaft 166, (see Figure 4), passes through the journal 175 and terminates in the bevel gear 176, which is pinned to the shaft 166 at 177.

This bevel gear drives the bevel gear 178, which is pinned at 179 to the shaft 180. The shaft 180 includes the portions 181 and 182 of greater diameter, and the portion 182 is pinned at 183 to the gear 184, which will be described.

A cylindrical member 185 is pinned at 186 to the shaft portion 182. The cylindrical member 185 also includes the cam 186a, which is shown in dotted lines. The pin 187 rides within this cam, and the pin 187 is further secured to the cam 188, which is pinned at 189 to the shaft 190.

The gear 191 will turn the outer cup 192 and the small shaft 190 turns the small cup 193. (See Figures 4 and 5).

The small yolk cup 193 is provided with the integral extension 194 into which the shaft 195 is firmly screwed at 196. The outer end of this shaft 195 terminates in the collar 197 and the portion 198, which portion includes the slotted opening 199.

This slotted opening engages the pin 200, which passes through the cylindrical opening 201 at the end of the shaft 190.

The portion 202 is received within the recess 203, and the spring clips 204 are adapted to snugly engage within the groove 205.

The flanged shaft 206 is utilized to turn the albumen cup 192 by means of the extended element 207 engaging into the recess 208.

It will be seen therefore that the gear 191, by virtue of its pinned engagement at 209 with the portion 210, will rotate the cup 192, since the element 208 is rigidly secured to the cup 192 at 210a and 211.

The member 184 is provided with gear teeth at 212, which teeth are arranged only on part of the periphery of the lower face so that the cup 192 can be dumped when so desired.

The tapping arrangement for breaking the shell is shown more clearly in Figure 7. The shaft 66, (see Figure 1), carries the collar 213, which includes the thread form 214.

The lever 215 is pivoted at 216 to the member 217, which is an integral raised portion of the case 10, and the end of the lever 215 is pivoted at 216 to the aforementioned tapper 136, which tapper passes through the hollow guide 218. A spring 219 is positioned as shown to apply tension against the lever 215.

It will be seen that when the shaft 66 rotates, the inner end of the lever 215 will be carried to the outer point of the thread 214 at 219a and then suddenly released and by virtue of the tension of the spring 219, the tapper 136 will strike a blow in the direction of the arrow as shown at 220 against the collar 129 as explained before. (See Figure 8.)

We will now pass to the cycles of the machine. (See Figure 11.) I have shown the positions of the dumping cups as 1, 2, 3, 4, 5 and 6 and also the position where the cups pass from 6 to 1; in other words from the sixth to the first or receiving position. Also see Figure 14, which shows the six positions of the turret carrying the cups. Of course it will be understood that the turret constantly carries three cups as shown in Figure 2, and each cup is constantly passing through the same cycle as shown in Figure 11, but in order to analyze the machine in the simplest manner it is necessary to explain the operation of one cup throughout the entire motion of the turret.

By comparing Figure 14 and Figure 11, the positions will be clearly shown at the same time as the dumping method. The small cup at Figure 11 is indicated as 193 and the larger by 192. The small cup 193 receives the yolk of the egg, and the larger cup 192 the albumen.

At the position 1 of Figure 11, both cups are upright and ready to receive. At this point the functions explained in Figures 8 to 10 begin to operate. (Also see Figure 3.) We will assume an egg is in the position shown by the character 220 in Figure 3. By means of the link operated by the shaft 35, the egg is carried forward on the two fingers 56 and 57. These fingers carry the egg forward into the breaking mechanism as shown in Figures 8 to 10. At this point the shaft 70 in turning and by virtue of the cam 75, the pins 137 and 138 and the collars 77 and 78, these collars are brought forwardly towards the egg, and the egg is comparatively securely grasped by means of the various fingers and the adjustable element 110.

At this point the fingers carrying the egg are within the breaking device and rest slightly above the fingers 112 and 113. As soon as the fingers grasp the egg, the link connected elements will carry the loader back again, and the fingers 56 and 57 will pass out of the breaking device.

As soon as the egg is grasped, the tapper functions and by virtue of the slight tapping motion imparted to the collar 129, the points 114 and 115 will penetrate the bottom of the egg and just after this, the links 82 and 83 will be drawn together as explained, and the egg will be broken and the shells carried apart as shown in Figure 10.

It is just at this moment that the cup as shown in Figure 1, at position 1, (also see Figure 11), starts to receive the yolk of the egg in the small cup, and the albumen in the large cup.

These cups are positioned so that their center line will rest directly beneath the opened egg so that the yolk will naturally fall in the center of the small cup and the while around it in the larger cup.

Then the ratchet 151, by virtue of the engagement of the pawl 153, the rod 155, and the cam 158 will turn this cup to the position as shown in Figure 2, and it will be understood that between each movement of the turret carrying the cups, this same operation takes place.

In Figures 2, 3 and 4, the cups are in the plane as shown in Figure 11, and these positions will make the inspection possible when the operator can watch the eggs and can detect a bad egg by sight or odor, and in the case of such can stop the machine at once by means of the clutch and simply remove the cups by pulling them out of the turret, sterilizing the same and replacing them.

At the position 5, the cup 192 carrying the albumen, starts to dump its contents. In this position, since the bevel gear 184 has teeth only partially around the periphery of its lower face as at 212, the cup 192 will start to turn completely over and will dump the albumen into the elongated funnel 221. This elongated funnel includes the opening 222, which terminates in the pipe 223, and which pipe conveys the albumen away to its proper container.

As shown in position 6, (Figure 11), the small cup 193 begins to turn over by means of the small cam 188, which is guided by the pin 187, which pin is received within the recessed cam 186. At this point the small cup 193 turns over and the yolk of the egg drops into the funnel 224, which terminates in the pipe 225, which conveys the yolk of the egg to its proper container.

In case it is desired to mix the yolk and white together, I merely provide the cap 226 shown in dotted lines, which cap is placed in the pipe 225 so nothing can pass down this same pipe.

The funnel 226 is placed slightly to one side in the larger funnel 221 so that the albumen will constantly tend to drop into this funnel 221, even as late as the sixth position shown. This is important since it prevents waste of any of the albumen and insures a complete draining of the cup 192.

Between the positions 6 to 1, as shown, both cups tend to right themselves, the small cup by the cam operation, and the larger one by virtue of the toothed arrangement, and there may be a small bit of albumen remaining as shown at 227, which is simply caught again during the rotation of the larger cup, and it will be seen from this, that there can be no waste of the albumen. The same cycle is again repeated.

It will be seen in Figure 12 that the funnel is arranged so that it is more of an arced shape, in order to follow the path of the cups.

Figure 13 shows the stripper arrangement. At the position 2, this stripper arrangement functions. The small cam 149, (see Figure 10), operates this device. This device sets off at an angle from the center line of the shaft 70, so that it will function in the position shown at Figures 2 and 14, and this stripper works when the collar 77 is in its outer position.

As the collar 77 travels outwardly, the portion 149 bears against the inclined element 228, which is pivoted at 229 to the bracket 230 of the stripper. As the collar 77 travels outwardly, it passes against the inclined surface 231 of the element 228. The element 228 is pivoted at 232 to the plunger 233.

This plunger then travels downwardly and the main stripper element 234, which is shaped as shown, passes downwardly over the small cup 193 and by virtue of its fairly firm engagement with the upper periphery of the cup, any albumen which may have adhered to this portion of the cup, will be stripped away and will be dropped down into the cup 192.

A ball socket joint is provided at 235 to provide any variations, and the springs 236 and 237 are provided to take care of further variations or adjustments as to the further slight variations, which may be encountered in the cups and so forth.

The cup 238 is secured through the plunger 233 and rides up and down in the closed slot 239 so that it can be stopped at 240.

It will now be necessary to explain a little more clearly just how the loader device, as shown in Figure 3, operates.

The shafts 47 and 48 operate the loader 58, which loader is adapted to carry the eggs forwardly in the successive positions. As the small egg is carried forwardly on the member 58, it strikes against the small weighted portions 63 and 64, which tend to bear against the outer surface of the egg at its ends and in so doing, by means of this stroking motion, the tendency is to straighten the egg out so that its longitudinal axis is practically at right angles to the long axis of the loader, and as soon as the member 58 moves backwardly, the egg will drop down between the fingers 56 and 57, and the operations explained before will begin to take place.

It will be understood, of course, that the various cams employed in my device are perfectly synchronized to achieve the ends desired and that the operations will be performed correctly and in the proper order.

The small platform, (see Figure 3), is provided as was explained for the emergency, which may occur when a small egg is placed on the fingers 47 and 48. A small egg also, may tend to drop so that its long axis is parallel to the fingers. However, in the forward movement of the loader it will be adjusted with its axis, correctly at right angles to these fingers.

It will be seen that I have provided a machine which will efficiently break any number of eggs consecutively, will separate the contents of the eggs effectively, will provide superior inspection methods, and is made simply enough to reduce to a minimum the hazards of parts wearing out and break-down and which simplicity insures minimum cost of manufacture.

All of the mechanisms in my invention have been developed through a series of experiments in order to insure perfect working of the machine, and the various parts have been so coordinated and balanced that the machine will operate without undue adjustments and so forth.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

1. In an egg breaking and separating machine, means for breaking eggs comprising a plurality of fingers arranged to grasp an egg, points positioned on a pair of the fingers, and a tapper for tapping the fingers to force the points into the lower side of the egg, said tapper comprising a rod, a levered arm positioned at right angles, and pivoted to the rod, spring tension means applied against the arm, and a rotating cam bearing against the outer end of the arm.

2. In an egg breaking and separating machine, means for breaking eggs comprising a plurality of fingers arranged to grasp an egg, points positioned on a pair of the fingers, and a tapper for tapping the fingers to force the points into the lower side of the egg, said tapper comprising a rod, a levered arm positioned at right angles, and pivoted to the rod, spring tension means applied against the arm, and a rotating cam bearing against the outer end of the arm, said cam including a single raised thread which bears against the arm to impart a sharp tapping impact to the rod as the end of the thread is reached.

3. In an egg breaking and separating machine, means for breaking eggs comprising a plurality of fingers arranged to grasp an egg, points positioned on a pair of the fingers, and a tapper for tapping the fingers to force the points into the lower side of the egg, said tapper comprising a rod, a levered arm positioned at right angles, and pivoted to the rod, spring tension means applied against the arm, and a rotating cam bearing against the outer end of the arm, said cam including a single raised thread which bears against the arm to impart a sharp tapping impact to the rod as the end of the thread is reached, and means arranged to open the fingers after the egg is broken.

4. In an egg breaking and separating machine, means for breaking eggs comprising a plurality of fingers arranged to grasp an egg, points positioned on a pair of the fingers, and a tapper for tapping the fingers to force the points into the lower side of the egg, said tapper comprising a rod, a levered arm positioned at right angles, and pivoted to the rod, spring tension means applied against the arm, and a rotating cam bearing against the outer end of the arm, said cam including a single raised thread which bears against the arm to impart a sharp tapping impact to the rod as the end of the thread is reached, and means arranged to open the fingers after the egg is broken, said means comprising a shaft, a pair of cams positioned on the shaft, pins received within the cams and a pair of links guided in closing and opening movement by the pins.

5. In an eggbreaking and separating machine, means for breaking eggs comprising a plurality of fingers arranged to grasp an egg, points positioned on a pair of the fingers, and a tapper for tapping the fingers to force the points into the lower side of the egg, said tapper comprising a rod, a levered arm positioned at right angles, and pivoted to the rod, spring tension means applied against the arm, and a rotating cam bearing against the outer end of the arm, said cam including a single raised thread which bears against the arm to impart a sharp tapping impact to the rod as the end of the thread is reached, and means arranged to open the fingers after the egg is broken, said means comprising a shaft, a pair of cams positioned on the shaft, pins received within the cams and a pair of links guided in closing and opening movement by the pins, and means for releasing the egg shells, after the egg is broken comprising a shaft including cams, a pair of rollers, and a pair of collars, guided in reciprocating movement by the cams.

6. In an egg breaking and separating machine, means for breaking eggs comprising a plurality of fingers arranged to grasp an egg, points positioned on a pair of the fingers, and a tapper for tapping the fingers to force the points into the lower side of the egg, said tapper comprising a rod, a levered arm positioned at right angles, and pivoted to the rod, spring tension means applied against the arm, and a rotating cam bearing against the outer end of the arm, said cam including a single raised thread which bears against the arm to impart a sharp tapping impact to the rod as the end of the thread is reached, and means arranged to open the fingers after the egg is broken, said means comprising a shaft, a pair of cams positioned on the shaft, pins received within the cams and a pair of links guided in closing and opening movement by the pins, and means for releasing the egg shells, after the egg is broken comprising a shaft including cams, a pair of rollers, and a pair of collars, guided in reciprocating movement by the cams, and a pair of integral arc shaped members secured to the collars, and against which the rollers bear.

7. In an egg breaking and separating machine, means for breaking eggs comprising a plurality of fingers arranged to grasp an egg, points positioned on a pair of the fingers, and a tapper for tapping the fingers to force the points into the lower side of the egg, said tapper comprising a rod, a levered arm positioned at right angles, and pivoted to the rod, spring tension means applied against the arm, and a rotating cam bearing against the outer end of the arm, said cam including a single raised thread which bears against the arm to impart a sharp tapping impact to the rod as the end of the thread is reached, and means arranged to open the fingers after the egg is broken, said means comprising a shaft, a pair of cams positioned on the shaft, pins received within the cams and a pair of links guided in closing and opening movement by the pins, and means for releasing the egg shells, after the egg is broken comprising a shaft including cams, a pair of rollers, and a pair of collars, guided in reciprocating movement by the cams, and a pair of integral arc shaped members secured to the collars, and against which the rollers bear, and a pair of springs arranged to force the rollers outwardly against the arc shaped members as the collars move outwardly.

GEORGE S. GIVEEN.